(12) United States Patent
Collins

(10) Patent No.: US 6,283,396 B1
(45) Date of Patent: Sep. 4, 2001

(54) TAPE TRANSPORT USING A CARRIER RIBBON WITH EDGES

(75) Inventor: Gary W. Collins, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/453,434

(22) Filed: Dec. 2, 1999

(51) Int. Cl.[7] .................................................. G03B 1/04
(52) U.S. Cl. ..................... 242/354; 242/340; 360/96.1; 226/172
(58) Field of Search ..................... 242/340, 354; 360/90, 96.1; 226/170, 171, 172

(56) References Cited

U.S. PATENT DOCUMENTS

| | | |
|---|---|---|
| 3,549,104 * | 12/1970 | Morrow ................................ 242/354 |
| 3,609,021 | 9/1971 | Gill . |
| 3,715,090 * | 2/1973 | Kostusiak et al. .................... 242/354 |
| 3,768,747 * | 10/1973 | Edwards et al. ...................... 242/340 |
| 3,808,902 | 5/1974 | Grant . |
| 3,942,743 | 3/1976 | Jinsenji . |
| 3,974,982 | 8/1976 | Stone . |
| 3,984,049 | 10/1976 | Shawen . |
| 4,072,279 | 2/1978 | Lewis . |
| 4,474,342 | 10/1984 | Nater . |
| 4,720,202 | 1/1988 | Kawakami . |
| 4,970,612 | 11/1990 | Renders et al. . |
| 5,695,142 * | 12/1997 | Rotter .................................. 242/340 |

* cited by examiner

Primary Examiner—Emmanuel M. Marcelo
(74) Attorney, Agent, or Firm—Brooks & Kushman P.C.

(57) ABSTRACT

A tape transport system for positioning magnetic tape over a tape head includes a carrier ribbon with edges defining a channel for carrying the tape. Ribbon guides bring the carrier ribbon into contact with the tape as the tape moves near the tape head. A separation guide is positioned to allow the tape to separate from the carrier ribbon as the tape passes the tape head.

21 Claims, 2 Drawing Sheets

TAPE TRANSPORT USING A CARRIER RIBBON WITH EDGES

TECHNICAL FIELD

The present invention relates to guiding magnetic tape past a tape access head.

BACKGROUND ART

Magnetic tape is commonly used to store voice and data information due to its reliability, cost efficiency, and ease of use. Magnetic tape may be made more useful and cost effective by increasing the density of information stored on the magnetic tape. One method of increasing information density is to decrease the thickness of the tape thereby permitting more tape to be stored in a given volume.

Decreasing the thickness of magnetic tape creates difficulties in a tape transport system. First, thinner tape more easily stretches, increasing the possibility of read and write errors. Tape stretching is exacerbated by complex tape transport systems and by moving the magnetic tape through tension provided by a take-up reel. Second, very thin tape may require mechanical support within the tape transport system to prevent folding, kinking, creasing, curling and other mechanical damage. Third, thin tape is easily skewed relative to the tape head. Therefore, some mechanism to position the tape relative to the tape head is required.

What is needed is an effective tape transport system for thin tape. The tape transport system must be able to move magnetic tape past the tape head without stretching or mechanical damage. The tape transport system should further be simple, inexpensive, and easy to maintain.

DISCLOSURE OF INVENTION

It is an object of the present invention to guide thin magnetic tape past a tape head.

It is another object of the present invention to position magnetic tape relative to the tape head.

It is still another object of the present invention to protect magnetic tape along the tape path.

It is yet another object of the present invention to reduce the complexity of the tape path.

In carrying out the above objects and other objects and features of the present invention, a tape transport system for positioning magnetic tape moving over a tape head is provided. The tape system includes a carrier ribbon having a width greater than the tape width. The carrier ribbon has edges which define a channel for carrying the magnetic tape. At least one ribbon guide is positioned to bring the carrier ribbon into contact with the tape passive side and to hold the carrier ribbon in contact with the tape as the tape moves near the tape head. At least one separation guide allows the tape to separate from the carrier ribbon as the tape passes the tape head. A ribbon drive operates to move the carrier ribbon past the guides.

In an embodiment of the present invention, the carrier ribbon is formed in a continuous loop.

In an another embodiment of the present invention, the carrier ribbon drives the tape at the tape speed past the tape head.

In still another embodiment of the present invention, the system further includes at least one bow roller in contact with the carrier ribbon. Each bow roller bends a portion of the carrier ribbon away from the tape over a portion of the tape path. The carrier ribbon captures the tape within the channel in a region of the tape path following the bow rollers.

In yet another embodiment of the present invention, the carrier ribbon includes openings permitting air that would otherwise be trapped between the tape and the carrier ribbon to pass through the carrier ribbon.

A method of transporting magnetic tape past the tape head is also provided. The method includes driving a carrier ribbon in the tape direction. The tape is contacted within a channel formed in the carrier ribbon in a region of the tape path prior to the tape head. The tape is separated from the carrier ribbon in a region of the tape path near the tape head.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 3 is a drawing of a carrier ribbon and bow rollers according to an embodiment of the present invention.

BEST MODE FOR CARRYING OUT THE INVENTION

Figure 1:
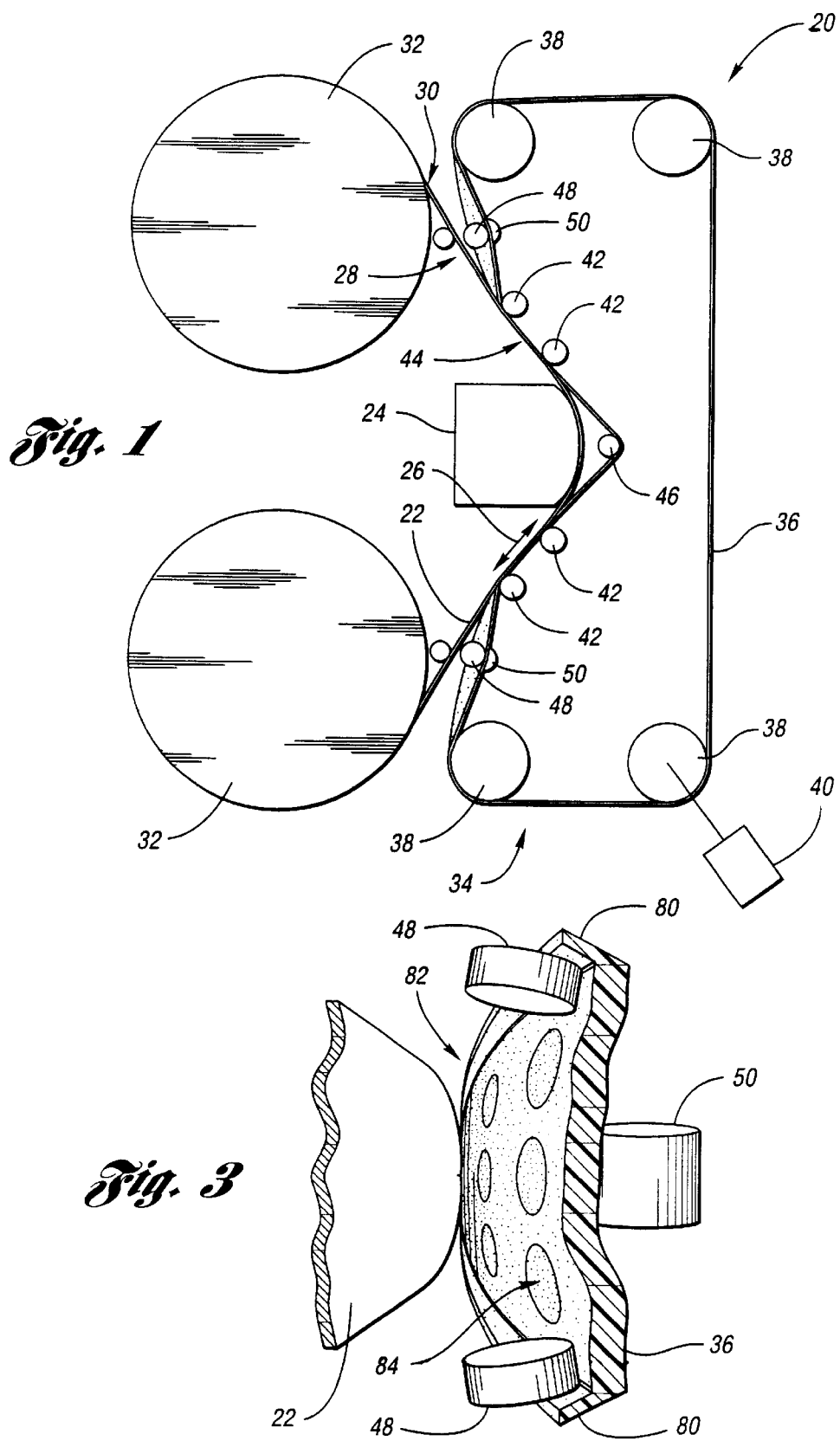
FIG. 1 is a schematic drawing of a tape transport system with a carrier ribbon according to an embodiment of the present invention.

Referring to FIG. 1, a schematic diagram of a tape transport system with a carrier ribbon according to an embodiment of the present invention is shown. A tape transport system, shown generally by 20, moves magnetic tape 22 past tape head 24 in either tape direction 26. Tape 22 has active side 28 onto which data can be written or from which data can be read by head 24. Opposite active side 28 is passive side 30. Tape 22 travels between two reels 32. Reels 32 may be contained within a tape cassette. Alternatively, one or both of reels 32 may be held within a tape cartridge. As will be recognized by one of ordinary skill in the art, the present invention will operate with a variety of means for holding tape 22.

Tape transport system 20 also includes a carrier ribbon assembly, shown generally by 34. Carrier ribbon assembly 34 includes carrier ribbon 36 driven around ribbon rollers 38 by ribbon drive 40. Ribbon drive 40 may be, for example, an electric motor as is known in the art of tape transport systems. Carrier ribbon 36 is positioned by at least one ribbon guide 42 near contact region 44 where tape 22 is in contact with carrier ribbon 36. Edges on carrier ribbon 36 form a channel into which tape 22 fits within contact region 44. Carrier ribbon 36 is pulled away from tape 22 by separation guide 46 in a region near where tape 22 contacts tape head 24.

Carrier ribbon 36 is shown as a continuous loop in FIG. 1. In an alternative embodiment, carrier ribbon 36 may be wound between two reels in a manner similar to tape 22 and reels 32.

In an embodiment of the present invention, tape 22 is driven by carrier ribbon 36. In other embodiments, tape 22 and carrier ribbon can be independently driven or tape 22 can drive carrier ribbon 36. Bow rollers 48 and backing roller 50, in a region preceding contact region 44 in the direction of tape travel, are used to bend back the edges of carrier ribbon 36. This permits tape 22 to enter the channel and be firmly supported when the channel edges return to their normal position in contact area 44.

To assist in threading tape transport system 20, carrier ribbon assembly 34 may be moved away from head 24. Alternatively, or in addition, head 24 may be moved away from carrier ribbon assembly 34.

Figure 2:
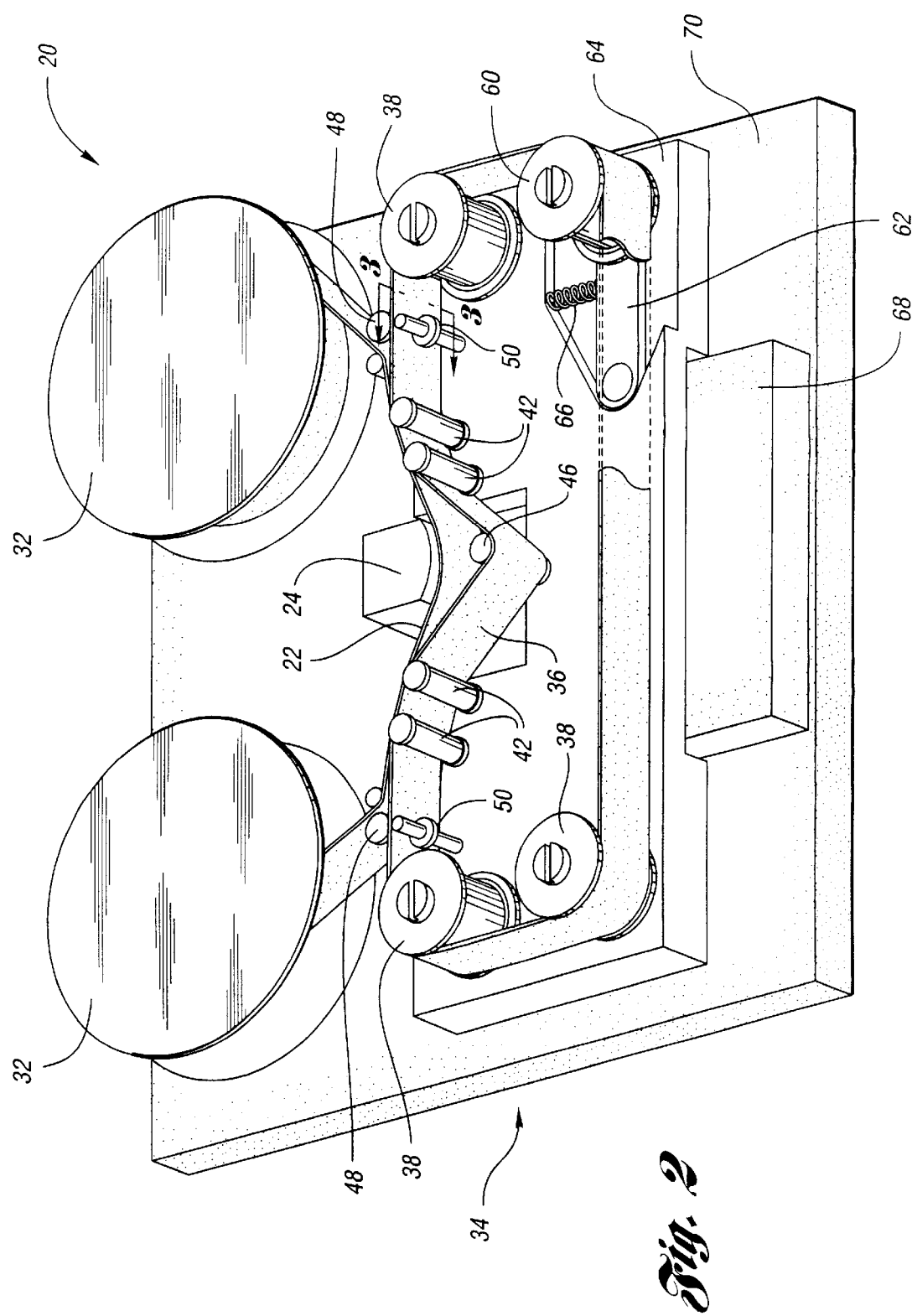
FIG. 2 is a detailed drawing of a tape transport system according to an embodiment of the present invention.

Referring now to FIG. 2, a detailed drawing of a tape transport system according to an embodiment of the present invention is shown. Carrier ribbon assembly 34 includes tensioning roller 60 rotationally mounted on arm 62. Arm 62 is pivotally hinged to carrier ribbon assembly plate 64. Spring 66 between arm 62 and plate 64 provides tensioning pressure on carrier ribbon 36.

Rollers 38, 48, 50, 60 and guides 42,46 are mounted to carrier ribbon assembly plate 64. Guide 68, attached to base plate 70, permits carrier ribbon assembly plate 64 to slide away from head 24 for threading tape 22.

Referring now to FIG. 3, a drawing of the carrier ribbon and bow rollers according to an embodiment of the present invention is shown. Edges 80 on carrier ribbon 36 define a channel, shown generally by 82, into which fits tape 22. Bow rollers 48 push carrier ribbon 36 against backing roller 50, forcing back edges 80 and opening channel 82. As carrier ribbon 36 containing tape 22 approaches contact area 44, edges 80 return to their normal position capturing tape 22.

Carrier ribbon 36 may be manufactured from a variety of engineering polymers such as, for example, Mylar or a weave including fibers of a polyester core coated with urethane. The spacing between edges 80 is preferably the same as the width of tape 22. The thickness of carrier ribbon 36 is approximately 0.4 to 0.6 millimeters. The length of edges 80 should be at least the thickness of tape 22. Thin tape 22 typically has a thickness between 5 and 15 microns.

In a preferred embodiment, carrier ribbon 36 includes a plurality of holes, one of which is indicated by 84. Holes 84 permit air otherwise trapped between tape 22 and carrier ribbon 36 to pass through carrier ribbon 36 as tape 22 comes into contact with carrier ribbon 36. Alternatively, carrier ribbon 36 may be woven with openings through which air may pass or may be manufactured from a porous material.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A tape transport system for positioning magnetic tape moving at a tape speed over a tape head, the magnetic tape having an active side that may be written on and read from by the head and a passive side opposite the active side, the active and passive sides defining a tape width, the system comprising:

a carrier ribbon having a width greater than the magnetic tape width, the carrier ribbon operative to contact the tape passive side, the carrier ribbon comprising edges which define a channel for carrying the magnetic tape, the width of the channel substantially equal to the tape width;

at least one ribbon guide positioned to bring the carrier ribbon into contact with the magnetic tape passive side and to hold the carrier ribbon in contact with the magnetic tape passive side as the magnetic tape moves near the tape head;

at least one separation guide positioned to allow the magnetic tape to separate from the carrier ribbon as the magnetic tape passes the tape head contact surface; and a ribbon drive operative to move the carrier ribbon past the at least one ribbon guide and the at least one separation guide.

2. A tape transport system as in claim 1 wherein the carrier ribbon is formed in a continuous loop.

3. A tape transport system as in claim 1 wherein the carrier ribbon is operative to drive the magnetic tape at the tape speed past the tape head.

4. A tape transport system as in claim 1 further comprising a carrier ribbon tensioner operative to maintain substantially constant tension on the carrier ribbon.

5. A tape transport system as in claim 1 further comprising at least one bow roller in contact with the carrier ribbon, each bow roller operative to bend a portion of the carrier ribbon away from the magnetic tape over a first range of a tape path.

6. A tape transport system as in claim 5 wherein the carrier ribbon is operative to capture the magnetic tape within the channel defined by the edges in a second range of the tape path adjacent to the first range of the tape path.

7. A tape transport system as in claim 1 wherein the carrier ribbon comprises a plurality of openings.

8. A method of transporting magnetic tape in a tape direction along a tape path past a tape head, the method comprising:

driving a carrier ribbon in the tape direction;

contacting the magnetic tape within a channel formed in the carrier ribbon, the magnetic tape contacted in a region of the tape path prior to the tape head in the direction of tape travel; and separating the magnetic tape from the carrier ribbon in a region of the tape path near the tape head.

9. A method of transporting magnetic tape as in claim 8 further comprising forming the carrier ribbon as a continuous loop.

10. A method of transporting magnetic tape as in claim 8 wherein driving the carrier ribbon comprises driving the carrier ribbon at the same velocity as the magnetic tape.

11. A method of transporting magnetic tape as in claim 8 further comprising maintaining substantially constant tension on the carrier ribbon.

12. A method of transporting magnetic tape as in claim 8 wherein contacting the magnetic tape comprises bending the carrier ribbon to enlarge an opening in the channel.

13. A method of transporting magnetic tape as in claim 12 further comprising closing the channel opening to grip sides of the magnetic tape with edges on the carrier ribbon forming the channel.

14. A method of transporting magnetic tape as in claim 8 wherein contacting the magnetic tape comprises permitting air otherwise trapped between the magnetic tape and the carrier ribbon to pass through the carrier ribbon.

15. A system for guiding magnetic tape past a tape head in a tape direction comprising:

a carrier ribbon comprising a channel;

means for driving the carrier ribbon in the tape direction;

means for contacting the magnetic tape within the channel in a region prior to the tape head in the direction of tape travel; and means for separating the magnetic tape from the carrier ribbon in a region near the tape head.

16. A system for guiding magnetic tape past a tape head as in claim 15 wherein the carrier ribbon is formed as a continuous loop.

17. A system for guiding magnetic tape past a tape head as in claim 15 wherein the carrier ribbon moves the magnetic tape past the tape head.

18. A system for guiding magnetic tape past a tape head as in claim 15 further comprising means for tensioning the carrier ribbon.

19. A system for guiding magnetic tape past a tape head as in claim 15 further comprising means for bending the carrier ribbon to enlarge an opening in the channel.

20. A system for guiding magnetic tape past a tape head as in claim 19 further comprising means for closing the channel opening to grip sides of the magnetic tape with edges on the carrier ribbon forming the channel.

21. A system for guiding magnetic tape past a tape head as in claim 15 wherein the carrier ribbon comprises means for permitting air otherwise trapped between the magnetic tape and the carrier ribbon to pass through the carrier ribbon.

* * * * *